United States Patent [19]

Herget et al.

[11] Patent Number: 5,618,342
[45] Date of Patent: Apr. 8, 1997

[54] PIGMENT PREPARATION

[75] Inventors: Gerhard Herget, Ober Ramstadt; Otto Stahlecker; Manfred Kieser, both of Darmstadt, Germany

[73] Assignee: Merck Patent Gesellschaft MIT Beschrankter Haftung, Darmstadt, Germany

[21] Appl. No.: 244,461

[22] PCT Filed: Nov. 21, 1992

[86] PCT No.: PCT/EP92/02683

§ 371 Date: Jun. 2, 1994

§ 102(e) Date: Jun. 2, 1994

[87] PCT Pub. No.: WO93/11199

PCT Pub. Date: Jun. 10, 1993

[30] Foreign Application Priority Data

Dec. 4, 1991 [DE] Germany .......................... 41 39 993.5

[51] Int. Cl.[6] .................................................. C04B 14/20
[52] U.S. Cl. ........................... 106/416; 106/410; 106/413; 106/415; 106/417; 106/418; 106/438; 106/441; 106/468; 106/469; 106/486; 106/DIG. 3
[58] Field of Search ............................. 106/410, 413, 106/415, 416, 417, 418, 438, 441, 468, 469, 486, DIG. 3

[56] References Cited

U.S. PATENT DOCUMENTS

| 3,758,322 | 9/1973 | Roberts et al. | 106/445 |
|---|---|---|---|
| 4,116,711 | 9/1978 | Avera | 106/415 |
| 4,138,270 | 2/1979 | Ishijima et al. | 106/415 |
| 4,952,245 | 8/1990 | Iwano et al. | 106/415 |
| 4,988,502 | 1/1991 | Ounanian et al. | 424/63 |
| 5,094,852 | 3/1992 | Ohno et al. | 106/415 |
| 5,098,712 | 3/1992 | Ohno et al. | 424/401 |
| 5,116,664 | 5/1992 | Kimura et al. | 106/436 |
| 5,165,915 | 11/1992 | Tokubo et al. | 106/415 |
| 5,221,342 | 6/1993 | Minami et al. | 106/461 |
| 5,407,674 | 4/1995 | Prengel et al. | 106/415 |

*Primary Examiner*—Mark L. Bell
*Assistant Examiner*—Scott L. Hertlog
*Attorney, Agent, or Firm*—Millen, White, Zelano & Branigan, P.C.

[57] ABSTRACT

The invention relates to a non-dusting, homogeneous pigment preparation containing
at least 70% by weight of one or more flaky pigments,
1–30% by weight of water,
0.1–20% by weight of a humectant, and
less than 1.00% by weight of one or more preservatives.

10 Claims, No Drawings

PIGMENT PREPARATION

BACKGROUND OF THE INVENTION

The invention relates to a non-dusting, homogeneous pigment preparation.

Industrially, pigments are frequently not used in the form of powders, since the latter are prone to dusting, which necessitates tighter occupational hygiene safety requirements. Furthermore, powders introduced into plastics, basecoating systems, etc. are frequently observed to agglomerate, and it is very difficult or even impossible to achieve a homogeneous distribution of the pigment in the particular matrix.

Instead of pigment powders non-dusting pigment preparations are used. The components of the preparation should be highly compatible with the other components of the particular coating system and should ensure for example ready homogeneous dispersal of the preparation after it has been incorporated.

Aqueous pigment preparations, which have long been needed for example for cosmetics, are becoming increasingly important for other applications, for example for the production of waterborne paints etc., for environmental reasons.

As well as good compatibility with the other constituents of the coating system, pigment preparations must possess high stability; that is, they must not be prone to phase separation. This requirement is particularly important in the case of pigment preparations based on flaky pigments, since in the event of phase separation these pigments, owing to their structure, tend to clump together and are very difficult to redisperse and since the separation phenomenon occurs in a particularly pronounced form in pigment preparations containing flaky pigments. For instance, an aqueous pigment preparation obtained by pasting a powder of flaky pearl luster pigments with water lacks stability.

The preparations of flaky pigments hitherto developed for use in aqueous coating systems do not meet the stated requirements.

SUMMARY OF THE INVENTION

An object of the present invention is therefore to provide pigment preparations based on flaky pigments which
* can be used in aqueous coating systems,
* possess high stability, and
* are characterized by high compatibility with the other components of the coating system.

It has been found that this object is achieved by the preparations according to the present invention.

The present invention accordingly provides non-dusting, homogeneous pigment preparations for use in aqueous coating systems which contain
at least 70% by weight of one or more flaky pigments,
1–30% by weight of water,
0.1–20% by weight of a humectant, and
less than 1.00% by weight of one or more preservatives.

The flaky pigments used are preferably interference pigments based on flaky, transparent or semi-transparent substrates made for example of sheet-silicates such as mica, talc, kaolin, or of glass or other silicated materials which have been coated with one or more layers of at least one metal oxide or metal oxide hydrate. More particularly, at least one of these layers preferably contains one or more high refractive index metal oxides or metal oxide hydrates selected from the following group:

titanium oxide, tin oxide, zirconium oxide, zinc oxide, iron oxide, chromium oxide, nickel oxide, cobalt oxide and the corresponding oxide hydrates.

It is also possible to use in the pigment preparations of the invention flaky metal oxides such as, for example, iron oxide or bismuth oxychloride.

As flaky pigments it is also possible to use metal flakes which may be uncoated or else coated with one or more metal oxide layers; preference is given for example to Al, Cr, Fe, Au, Ag and steel flakes. If readily corrodible metal flakes such as, for example, Al, Fe or steel flakes are to be used without a coating of metal oxide, they are preferably coated with a protective polymer layer.

These flaky pigments are known and are for the most part commercially available and/or they are preparable by standard methods known to the person skilled in the art. Interference pigments based on transparent or semitransparent flaky substrates (pearl luster pigments) are described for example in the German Patents and Patent Applications 14 67 468, 19 59 998, 20 09 566, 22 14 454, 22 15 191, 22 44 298, 23 13 331, 25 22 572, 31 37 808, 31 37 809, 31 51 343, 31 51 354, 31 51 355, 32 11 602 and 32 35 017.

The pigments of the invention may contain one or more flaky pigments, frequently, special effects can be achieved by using at least two different pigments. The weight proportion of flaky pigment in the colorant preparations according to the invention is not less than 70% by weight and in particular at least 80% by weights particular preference is given to colorant formulations according to the invention which have a pigment weight proportion of more than 85% by weight.

It has now been found that non-dusting, homogeneous colorant preparations are obtained on admixing the flaky pigments with water and with a humectant.

The humectant preferably comprises one or more compounds selected from the group consisting of the following compounds:

glycerol, substituted glycerols, sorbitol, polyethylene glycols, polyvinylpyrrolidones and polypropylene glycols.

This list is to illustrate the invention not limit it. As well as the listed compounds it is also possible to use other substances, in particular polyhydroxy compounds.

Very particularly preferred humectants contain glycerol, substituted glycerols and/or sorbitol.

The colorant preparations obtained through the addition of both water and a humectant to the flaky pigments are very stable in that no phase separation is observed even following storage times of more than several months and longer. By contrast, conventional aqueous colorant preparations, where only water is added to the flaky pigments, are distinctly less stable in that they show distinct signs of phase separation after just a few days or weeks, generally in the form of water collecting in the bottom of the reservoir vessel.

The weight proportion of humectant in the pigment preparation according to the invention is between 0.1–20% by weight, and in particular between 0.5 and 15% by weight. The water content is between 1 and 30% by weight, in particular between 2.5 and 25% by weight.

It was found that the ratio of the weight proportions of water and humectant can be varied within wide limits without impairing the stability of the pigment preparation according to the invention as long as the sum total of the weight proportions of water and humectant is between 1 and 30% by weight. Pigment preparations where the sum total of these weight proportions is not less than 5% and in particular at least 7.5% generally have particularly favorable properties, under these conditions it is very particularly preferable for the weight proportion of humectant not to be less than 5%, since the non-dusting character of the pigment preparations according to the invention is then in general particularly pronounced. The sum of the weight proportions of water and humectant are preferably set sufficiently low for the pigment preparation not to contain a continuous liquid phase.

It was observed that pigment preparations which contain flaky pigments, water and a humectant are prone to nucleation in particular on prolonged storage and/or in the presence of higher water contents and/or in particular in the event of contamination by organic material. This severely restricts the usefulness of such pigment preparations for important application areas, for example in cosmetic products, in printing inks for food packaging and elsewhere.

It has now been found that the addition of a small amount of one or more preservatives strongly suppresses the nucleation tendency without adversely affecting the other advantageous properties of the pigment preparations, in particular their stability.

The weight proportion of preservative in the pigment preparation according to the invention is less than 1.00% by weight, in particular between 0.005 and 0.25% by weight.

The preservative(s) is or are preferably selected from the following group of preservatives:

sorbic acid, benzoic acid, PHB ester, formic acid, propionic acid.

This list of particularly suitable preservatives is merely to illustrate the invention and not limit it. Besides these preservatives it is also possible to use other preservatives, which may be selected for example from the preservatives specified in Lackrohstofftabellen, 1987, Hanover, Curt V. Verlag.

The pigment preparations according to the invention are simply prepared by adding water, the humectant and the preservative component to the flaky pigment(s) and gently homogenising this mixture in a mixer, in particular a powder mixer. It has been found to be advantageous in this connection not to add the humectant and the water all at once but for the addition to be continuous with stirring. The preservative component is in general dissolved in the water, and the humectant and the water can be added separately or else as a mixture. The addition by way of a spray dispenser is of advantage.

The pigment preparations according to the invention are notable for
* good compatibility with the other components of aqueous coating systems
* the absence of dust
* high stability
* good processibility, and
* minimal, if any, nucleation tendency and they are distinctly superior to conventional pigment preparations.

The pigment preparations of the invention can be put to many uses. They are preferably used in aqueous coating systems in the areas of printing, paints and cosmetics. The pigment preparations are particularly preferred for making cosmetics and for printing food packages and textiles. A further important field of application is waterborne paints.

The pigment preparations of the invention thus are also of considerable commercial importance.

The examples which follow are to illustrate the invention without limiting it.

EXAMPLES

Example 1

A pigment preparation containing 9 kg of the flaky pearl luster pigment Iriodin® 550 (commercial product from E. Merck, Darmstadt; mica coated with iron(III) oxide), 100 g of glycerol, 1 g of potassium sorbate, 0.3 g of sodium salt of propyl 4-hydroxybenzoate (PHB ester) and 900 g of distilled water is non-dusting, possesses high stability and shows no nucleation tendency.

Example 2

A pigment preparation containing 9 kg of the flaky pearl luster pigment Iriodin® 300 (commercial product from E. Merck, Darmstadt; mica coated with iron(III) oxide and titanium(IV) oxide), 100 g of glycerol, 1 g of potassium sorbate, 0.3 g of sodium salt of propyl 4-hydroxybenzoate (PHB ester) and 900 g of distilled water is non-dusting, possesses high stability and shows no nucleation tendency.

Example 3

A pigment preparation containing 9 kg of the flaky pearl luster pigment Iriodin® 320 (commercial product from E. Merck, Darmstadt; mica coated with iron(III) oxide and titanium(IV) oxide), 100 g of glycerol, 1 g of potassium sorbate, 0.3 g of sodium salt of propyl 4-hydroxybenzoate (PHB ester) and 900 g of distilled water is non-dusting, possesses high stability and shows no nucleation tendency.

Example 4

A pigment preparation containing 9 kg of the flaky pearl lustre pigment Iriodin® 163 (commercial product from E. Merck, Darmstadt; mica coated with titanium(IV) oxide), 100 g of glycerol, 1 g of potassium sotbate, 0.3 g of sodiumsalt of propyl 4-hydroxybenzoate (PHB ester) and 900 g of distilled water is non-dusting, possesses high stability and shows no nucleation tendency.

Example 5

A pigment preparation containing 9 kg of the flaky pearl lustre pigment Iriodin® 120 (commercial product from E. Merck, Darmstadt; mica coated with titanium(IV) oxide), 100 g of glycerol, 1 g of potassium sotbate, 0.3 g of sodium salt of propyl 4-hydroxybenzoate (PHB ester) and 900 g of distilled water is non-dusting, possesses high stability and shows no nucleation tendency.

Example 6

A pigment preparation containing 9 kg of the flaky pearl lustre pigment Iriodin® 100 (commercial product from E. Merck, Darmstadt; mica coated with titanium(IV) oxide), 100 g of glycerol, 1 g of potassium sotbate, 0.3 g of sodium salt of propyl 4-hydroxybenzoate (PHB ester) and 900 g of distilled water is non-dusting, possesses high stability and shows no nucleation tendency.

Example 7

A pigment preparation containing 9 kg of the flaky pearl lustre pigment Iriodin® 103 (commercial product from E. Merck, Darmstadt; mica coated with tin(IV) oxide and titanium(IV) oxide), 100 g of glycerol, 1 g of potassium sorbate, 0.3 g of sodium salt of propyl 4-hydroxybenzoate (PHB ester) and 900 g of distilled water is non-dusting, possesses high stability and shows no nucleation tendency.

Example 8

A pigment preparation containing 9 kg of the flaky pearl luster pigment Iriodin® 123 (commercial product from E. Merck, Darmstadt; mica coated with tin(IV) oxide and titanium(IV) oxide), 100 g of glycerol, 1 g of potassium sotbate, 0.3 g of sodium salt of propyl 4-hydroxybenzoate (PHB ester) and 900 g of distilled water is non-dusting, possesses high stability and shows no nucleation tendency.

We claim:

1. A non-dusting, homogeneous pigment preparation consisting of
   at least 70% by weight of one or more pearlescent pigments,
   2 to 25% by weight of water,
   5 to 15% by weight of a humectant, and optionally
   less than 1.00% by weight of one or more preservatives.

2. A preparation according to claim 1, wherein the sum total of the weight proportion of water and weight proportion of humectant is between 1 and 30% by weight.

3. A preparation according to claim 1, wherein the humectant comprises at least one glycerol, substituted glycerol, sorbitol, polyethylene glycol, polyvinylpyrrolidone or polypropylene glycol compound.

4. A preparation according to claim 1, containing a preservative which comprises sorbic acid, benzoic acid, PHB ester, formic acid, propionic acid or a mixture thereof.

5. A process for preparing a preparation according to claim 1, comprising admixing the pearlescent pigment with water, the humectant and optionally the preservative and gently homogenizing the mixture in a powder mixer.

6. An aqueous coating system, comprising a pigment according to claim 1.

7. A preparation according to claim 1, containing at least one preservative.

8. A preparation according to claim 1, with the proviso that the preparation is not a cosmetic composition.

9. An aqueous coating system according to claim 6, with the proviso that the system is not a cosmetic composition.

10. In a process for preparation of a cosmetic, plastic or base coating system, comprising combining a non-dusting pigment preparation and an aqueous base coating system, the improvement wherein the pigment preparation is one according to claim 1.

* * * * *